United States Patent
He et al.

(10) Patent No.: US 10,695,881 B1
(45) Date of Patent: Jun. 30, 2020

(54) SYSTEM AND METHOD FOR CONTROLLING OIL-INJECTION OF MACHINE TOOL

(71) Applicant: Buffalo Machinery Company Limited, Taichung (TW)

(72) Inventors: Yi-Lin He, Taichung (TW); Hsun-Fu Chiang, Taichung (TW); Chia-Hui Tang, Taichung (TW); Paul Chang, Taichung (TW)

(73) Assignee: Buffalo Machinery Company Limited, Taichung (TW)

( * ) Notice: Subject to any disclaimer, the term of this patent is extended or adjusted under 35 U.S.C. 154(b) by 0 days.

(21) Appl. No.: 16/398,951

(22) Filed: Apr. 30, 2019

(30) Foreign Application Priority Data

Jan. 16, 2019 (TW) .............................. 108200716 U

(51) Int. Cl.
*B23Q 11/04* (2006.01)
*B23Q 17/09* (2006.01)
*B23Q 11/10* (2006.01)

(52) U.S. Cl.
CPC .......... *B23Q 11/04* (2013.01); *B23Q 11/1084* (2013.01); *B23Q 17/0966* (2013.01); *B23B 2250/12* (2013.01)

(58) Field of Classification Search
CPC ............ B23Q 17/0996; B23Q 11/1084; B23Q 2250/12
See application file for complete search history.

(56) References Cited

U.S. PATENT DOCUMENTS

| | | | | |
|---|---|---|---|---|
| 6,302,654 B1 * | 10/2001 | Millet | ................. | F04C 18/0215 417/63 |
| 2004/0033785 A1 * | 2/2004 | Kasahara | ................. | H04B 1/40 455/73 |
| 2010/0066291 A1 * | 3/2010 | Chang | ..................... | H02P 23/04 318/460 |
| 2011/0144882 A1 * | 6/2011 | Bidner | ..................... | F01M 1/08 701/102 |
| 2014/0100765 A1 * | 4/2014 | Maki | ........................ | F01M 1/08 701/113 |
| 2014/0271002 A1 * | 9/2014 | Hoshino | ................ | B23Q 11/10 408/56 |

* cited by examiner

*Primary Examiner* — Kidest Bahta
(74) *Attorney, Agent, or Firm* — Banner & Witcoff, Ltd.

(57) ABSTRACT

A control system for controlling oil-injection of a machine tool includes a sensor, a signal-processing device and a control device. The sensor senses movement of a machine component of the machine tool and outputs a sense signal to the signal-processing device. The signal-processing device derives analysis signals from the sense signal and sends the analysis signals to the control device. The control device determines whether to output an oiling signal to the machine tool to trigger an oiling device to oil the machine component according to an accumulated moving distance and a variation value that are calculated based on the analysis signals.

20 Claims, 5 Drawing Sheets

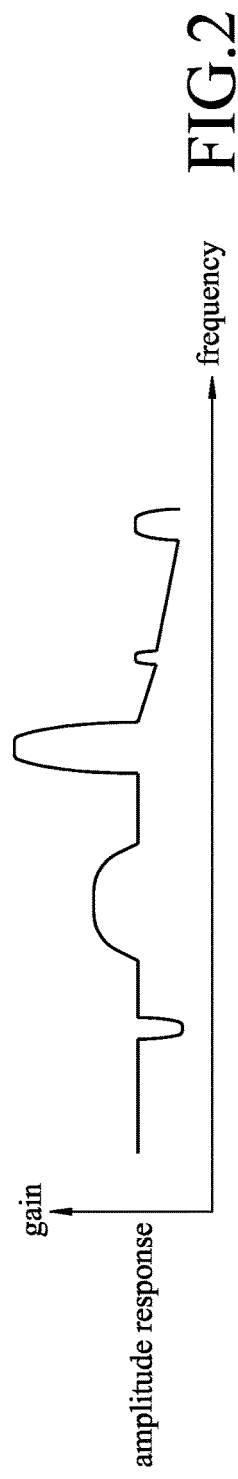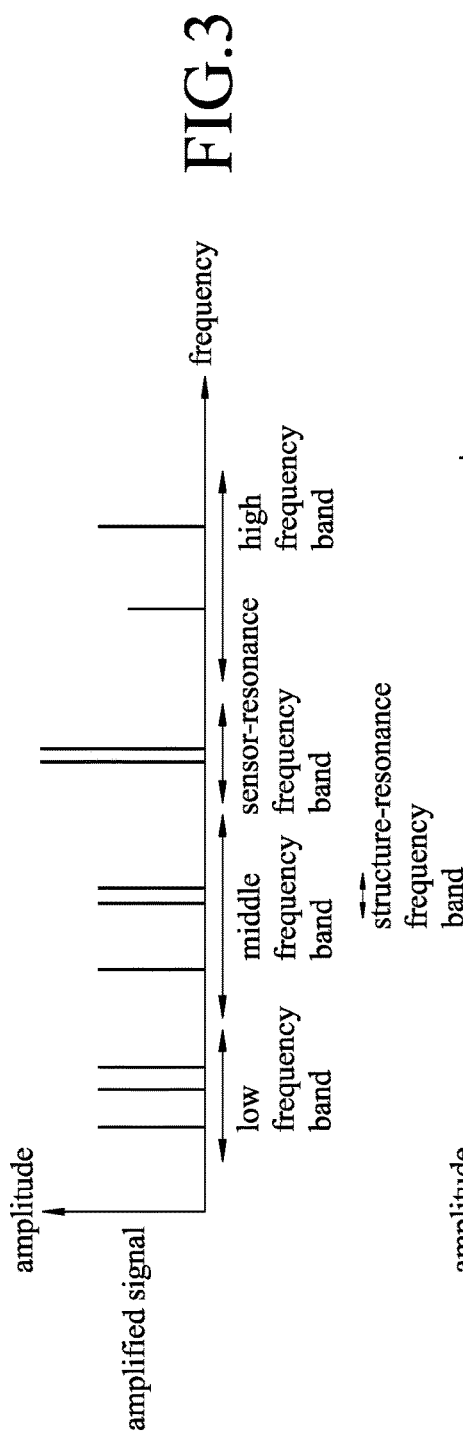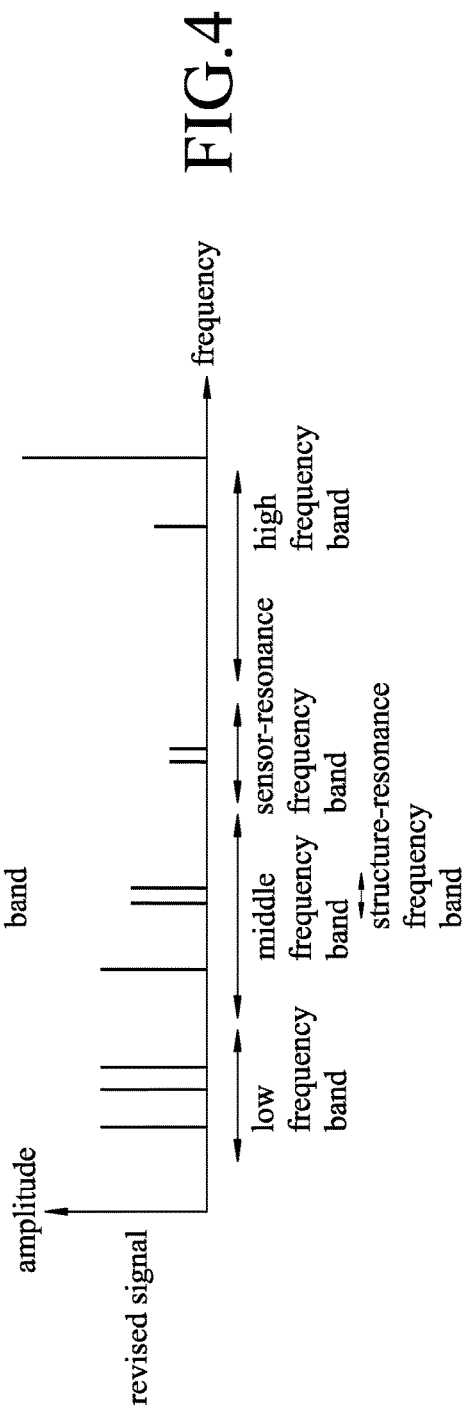

SYSTEM AND METHOD FOR CONTROLLING OIL-INJECTION OF MACHINE TOOL

CROSS-REFERENCE TO RELATED APPLICATION

This application claims priority of Taiwanese Utility Model Patent Application No. 108200716, filed on Jan. 16, 2019.

FIELD

The disclosure relates to a control method and a control system, particularly a method and a system for controlling oil-injection of a machine tool.

BACKGROUND

A machine tool uses guide rails to limit moving directions of its components. However, as the hours of use accumulate, the guide rails might be worn or damaged. For example, scratches or pits may appear on the guide rails. Such damages may cause undesired high-frequency vibrations that adversely affect the operation of the machine tool, creating faulty products. Severe damages may even cause a breakdown of the machine tool or injury of an operator of the machine tool. In order to prevent formation or aggravation of these damages, the machine tool (especially the guide rails) should be oiled in time.

SUMMARY

An object of the disclosure is to provide a control system and a method for controlling oil-injection of a machine tool that can efficiently improve safety and accuracy of operation of the machine tool.

According to one aspect of the disclosure, the control system includes a sensor, a signal-processing device and a control device. The sensor is to be disposed on the machine tool, and is configured to sense movement of a machine component of the machine tool and to output, based on the movement of the machine component 92 thus sensed, a sense signal related to vibration of the machine component. The signal-processing device is capable of communication with the sensor to receive the sense signal from the sensor, and is configured to derive, from the sense signal thus received, a low-frequency signal and a high-frequency signal that correspond respectively to different frequency bands. The control device is electrically connected to the signal-processing device, and is configured to receive the low-frequency signal and the high-frequency signal from the signal-processing device. The control device is configured to calculate an accumulated moving distance based on the low-frequency signal. The control device is configured to calculate a vibration-variation value based on the high-frequency signal. The control device is configured to output an oiling signal to the machine tool when the accumulated moving distance thus calculated is greater than a moving-distance threshold, the oiling signal triggering an oiling device of the machine tool to oil the machine component. The control device is further configured to output the oiling signal to the machine tool when the vibration-variation value thus calculated is greater than a vibration-variation threshold.

According to one aspect of the disclosure, the method is to be implemented by a control device electrically connected to a signal-processing device, the signal-processing device deriving a low-frequency signal and a high-frequency signal corresponding respectively to different frequency bands from a sense signal outputted by a sensor, the sensor sensing movement of a machine component of the machine tool and outputting the sense signal related to vibration of the machine component. The method including steps of: calculating an accumulated moving distance based on the low-frequency signal; calculating a vibration-variation value based on the high-frequency signal; outputting an oiling signal to the machine tool to trigger an oiling device of the machine tool to oil the machine component when the accumulated moving distance thus calculated is greater than a moving-distance threshold; and outputting the oiling signal to the machine tool when the vibration-variation value thus calculated is greater than a vibration-variation threshold.

BRIEF DESCRIPTION OF THE DRAWINGS

Other features and advantages of the disclosure will become apparent in the following detailed description of the embodiment (s) with reference to the accompanying drawings, of which:

FIG. 2 is a diagram schematically illustrating an exemplary frequency response curve;

FIG. 3 is a diagram schematically illustrating an exemplary amplified signal that is composed of plural frequency components;

FIG. 4 is a diagram schematically illustrating an exemplary revised signal derived from the sense signal of FIG. 3 based on the frequency response curve of FIG. 2;

DETAILED DESCRIPTION

Figure 1:
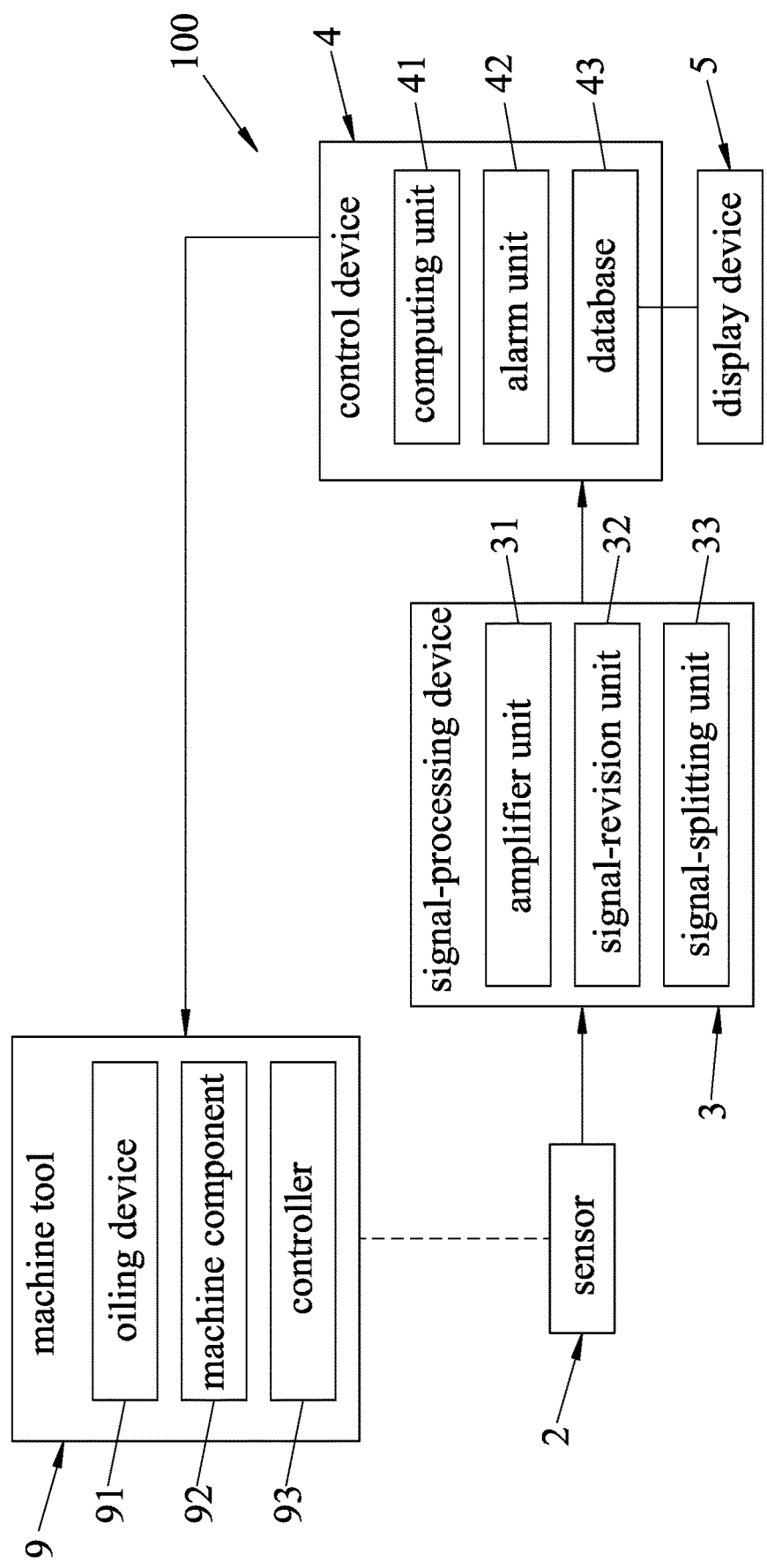
FIG. 1 is a block diagram exemplarily illustrating a control system according to an embodiment of this disclosure.
Figure 5:
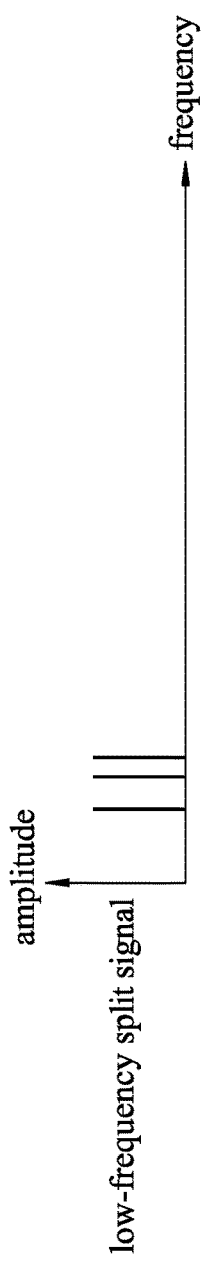
FIG. 5 schematically illustrates a low-frequency split signal.
Figure 6:
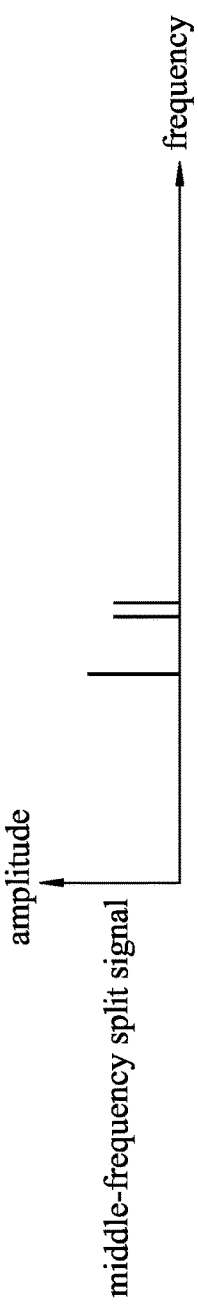
FIG. 6 schematically illustrates a middle-frequency split signal.
Figure 7:
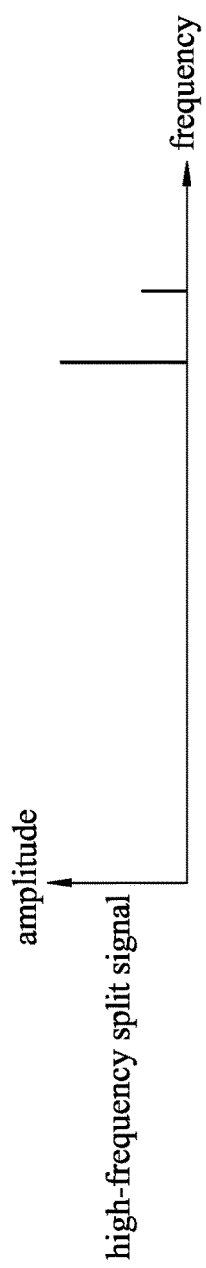
FIG. 7 schematically illustrates a high-frequency split signal.
Figure 8:
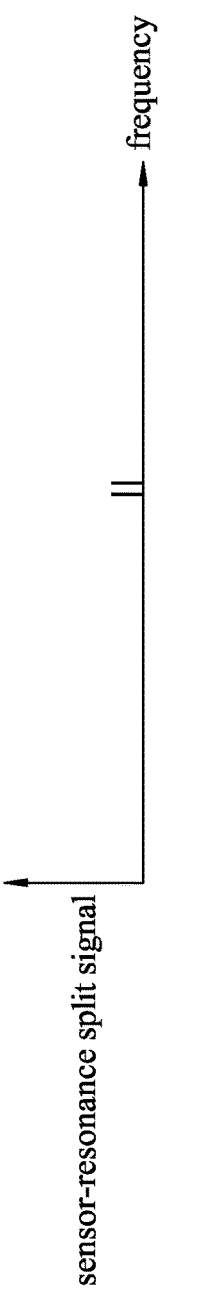
FIG. 8 schematically illustrates a sensor-resonance split signal.
Figure 9:
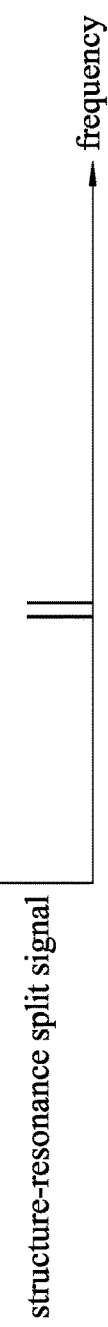
FIG. 9 schematically illustrates a structure-resonance split signal.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a control system 100 for controlling oil-injection of a machine tool 9 is disclosed in accordance with an embodiment of the disclosure. The control system 100 includes a sensor 2, a signal-processing device 3 in communication with the sensor 2, and a control device 4 electrically connected to the signal-processing device 3.

For example, the machine tool 9 includes a machine component 92, an oiling device 91 that is configured to inject oil to the machine component 92 (i.e., to oil the machine component 92), and a controller 93 that is coupled to the oiling device 91 and the machine component 92 to control operation of the oiling device 91 and the machine component 92. The machine tool 9 may be a numerical control (NC) machine tool. The machine component 92 may include, for example, at least one linear slide rail and/or at least one bearing (e.g., a linear-motion bearing), and the oiling device 91 may be configured to inject oil onto the linear slide rail (s) and/or the bearing (s).

According to an embodiment, the sensor 2 of the control system 100 is positioned in the vicinity of the machine tool 9 to sense movement of the machine component 92, and is configured to output a sense signal related to vibration of the machine component 92 based on the movement of the machine component 92 thus sensed. In an embodiment, the sensor 2 is disposed on the machine tool 9. According to some embodiments, the sense signal outputted by the sensor 2 may represent acceleration, velocity, or displacement of the movement of the machine component 92, and the sensor may be, for example, an accelerometer for acceleration measurement, a velocimeter for velocity measurement, or an optical linear encoder for position measurement. It should be noted that acceleration, velocity and displacement are mutually convertible parameters. That is, regardless of whether the sense signal outputted by the sensor 2 represents acceleration, velocity or displacement, the acceleration, velocity and displacement of the movement of the machine component 92 can all be derived from the sense signal.

The signal-processing device 3 is configured to receive the sense signal from the sensor 2, and to output plural analysis signals derived from the sense signal that correspond respectively to different frequency bands and that include at least a high-frequency signal and a low-frequency signal. In the illustrated embodiment, the signal-processing device 3 includes an amplifier unit 31, a signal-revision unit 32 in communication with the amplifier unit 31, and a signal-splitting unit 33 in communication with the signal-revision unit 32. The amplifier unit 31, the signal-revision unit 32 and the signal-splitting unit 33 may be electrical circuits.

In an embodiment, the amplifier unit 31 is an amplifier circuit, and is configured to receive the sense signal from the sensor 2, and to amplify the received sense signal into an amplified signal in order to facilitate performance of the signal-revision unit and the signal-splitting unit 33. The signal-revision unit 32 is configured to receive the amplified signal from the amplifier unit 31, and to adjust the amplified signal into a revised signal based on amplitude responses of a predetermined frequency response curve of the machine component 92, such that the revised signal may truly reflect the excitation force on the machine component 92 (namely, the force that attributes to the vibration of the machine component 92) to accurately evaluate vibration of the machine component 92. The frequency response curve of the machine component 92 may be predetermined by using a conventional test, for example, the impact hammer modal testing. Examples of the frequency response curve, the amplified signal and the revised signal are shown in FIGS. 2-4, respectively, wherein the frequency response curve is shown as an amplitude response curve. The signal-splitting unit 33 is configured to receive the revised signal from the signal-revision unit 32, and to extract plural split signals corresponding respectively to different frequency bands from the revised signal, wherein the plural split signals include at least a low-frequency split signal corresponding to a low frequency band and a high-frequency split signal corresponding to a high frequency band. The low-frequency split signal and the high-frequency split signal would be outputted by the signal-processing device 3 as the low-frequency signal and the high-frequency signal, respectively.

According to an embodiment, the plural split signals may also include a middle-frequency split signal corresponding to a middle frequency band, a sensor-resonance split signal corresponding to a sensor-resonance frequency band relating to a resonant frequency of the sensor 2, and a structure-resonance split signal corresponding to a structure-resonance frequency band relating to a resonant frequency of the machine component 92, in which case the middle-frequency split signal, the sensor-resonance split signal and the structure-resonance split signal would be outputted by the signal-processing device 3 as a middle-frequency signal, a sensor-resonance signal and a structure-resonance signal, respectively. According to some embodiments, the signal-splitting unit 33 may be implemented by analog filters or digital filters including, for example, a low pass filter and a high pass filter, and maybe plural band pass filters.

The number of said different frequency bands (and accordingly the number of the split signals generated by the signal-splitting unit 33) and the respective ranges of said different frequency bands may vary in different cases, and may be predetermined based on, for example, design parameters of the control system 100, characteristics of the sensor 2, characteristics of the machine tool 9, and/or characteristics of the machine component 92 (e.g., an aging characteristic of a linear slide rail of the machine component 92). The frequency bands may overlap or be completely non-overlapping with each other. According to an example, the sensor-resonance split signal relates to the resonance characteristic of the sensor 2, and the corresponding frequency band (i.e., the sensor-resonance frequency band) may be 18 kHz to 23 kHz. According to an example, the structure-resonance split signal relates to the structural characteristic of the machine tool 9, and the corresponding frequency band (i.e., the structural-resonance frequency band) may be 20 Hz to 500 Hz. However, according to another example, the structure-resonance split signal may include plural structure-resonance split signals that correspond to plural smaller frequency bands, respectively. For example, there may be four structure-resonance split signals corresponding to four frequency bands that are centered at 25 Hz, 88 Hz, 200 Hz and 230 Hz, respectively. According to an example, the low-frequency split signal relates to a frequency of the movement of the machine component 92 during operation, and the corresponding frequency band (i.e., the low frequency band) may be 0.001 Hz to 100 Hz. According to an example, the high-frequency split signal relates to undesired vibration of the machine component 92, and the frequency band corresponding to the high-frequency split signal (i.e., the high frequency band) may be 5 kHz to 50 kHz. According to an example, the middle-frequency split signal relates to an aging characteristic of, for example, a linear slide rail of the machine component 92, and the corresponding frequency band (i.e., the middle frequency band) may be designed to be a band between the high frequency band and the low frequency band, a band between the high frequency band and the low frequency band and not occupied by (or overlapping with) the sensor-resonance band, or a band between the high frequency band and the low frequency band and not occupied by (or overlapping with) the structural-resonance band(s), wherein the middle frequency band may be composed of several sub-bands. An exemplary distribution of the low frequency band, the high frequency band, the middle frequency band, the sensor-resonance frequency band and the structure-resonance frequency band is schematically illustrated in FIGS. 3 and 4, and FIGS. 5-9 schematically and respectively illustrate the low-frequency split signal, the middle-frequency split signal, the high-frequency split signal, the sensor-resonance split signal and the structure-resonance split signal that are extracted from the revised signal of FIG. 4. It should be noted that the disclosure is not limited to the described/illustrated split signals and/or frequency bands.

It should be noted that an alteration may be made to the signal-processing device 3 such that the amplified signal generated by the amplifier unit 31 is transmitted to the signal splitting unit 33 instead of the signal-revision unit 32. In such embodiment, the signal splitting unit 33 extracts the plural split signals (including at least the low-frequency split signal and the high-frequency split signal) corresponding respectively to the different frequency bands from the amplified signal that has not been adjusted by the signal-revision unit 32, and then transmits these split signals to the signal-revision unit 32 to be adjusted based on the frequency response curve of the machine component 92. In this case, since there are plural split signals to be adjusted by the signal-revision unit 32, the signal-revision unit 32 generates plural, rather than one, revised signals that might be referred to as, for example, low-frequency revised signal, high-frequency revised signal, etc. In this case, the signals (including at least the low-frequency signal and the high-frequency signal) outputted by the signal-processing device 3 are revised signals (including at least the low-frequency revised signal and the high-frequency revised signal) generated by the signal-revision unit 32 based on the split signals received from the signal splitting unit 33.

The control device 4 includes a computing unit 41, an alarm unit 42 and a database 43, wherein the alarm unit 42 and the database 43 are in communication with the computing unit 41. In an embodiment, the control device 4 is independent of the controller 93. In another embodiment, the control device 4 is incorporated with or integrated within the controller 93. The control device 4 is configured to receive the analysis signals (including at least the low-frequency signal and the high-frequency signal) from the signal-processing device 3, to output an oiling signal to the machine tool 9, and to deliver an alarm signal to users or display information about parameters related to operation of the machine component 92 based on the analysis signals thus received.

Figure 10:
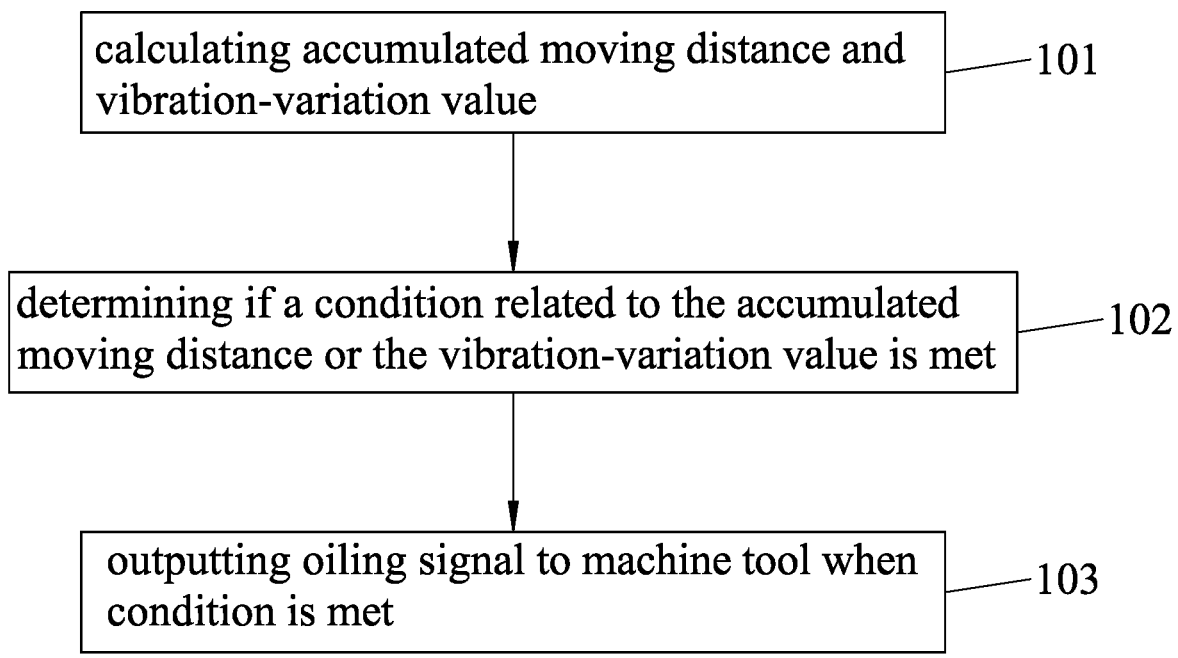
FIG. 10 schematically illustrates a method for controlling oil-injection of a machine tool according to an embodiment of this disclosure.

A method for controlling oil-injection of the machine tool 9 to be implemented by the control device 4 is illustrated in FIG. 10. In step 101, the control device 4 calculates an accumulated moving distance and a vibration-variation value based on the low-frequency signal and the high-frequency signal of the analysis signals received from the signal-processing device 3, respectively. In step 102, the control device 4 determines if any of the following two conditions is met: 1) the accumulated moving distance thus calculated being greater than a moving-distance threshold; and 2) the vibration-variation value thus calculated being greater than a vibration-variation threshold. Then, in step 103, the control device 4 will output the oiling signal to the machine tool 9 to trigger the oiling device 91 to oil the machine component 92 when any of these three conditions is met. Details of these steps will be described below.

According to an embodiment, the computing unit 41 is electrically connected with the signal-processing device 3 to receive the analysis signals (including at least the low-frequency signal and the high-frequency signal).

The computing unit 41 is configured to calculate a displacement value based on the low-frequency signal, the displacement value being related to a distance the machine component 92 has moved in a recent time unit (step 101). The displacement value may be calculated by, for example, performing double integration on acceleration measurement derived from the low-frequency signal in the case that the sense signal sensed by the sensor 2 is related to the acceleration of the machine component 92 or performing single integration on velocity measurement derived from the low-frequency signal in a case that the sense signal is related to the velocity of the machine component 92. In an embodiment, the computing unit 41 compares the displacement value thus calculated with a predetermined displacement-value threshold, and when the displacement value exceeds the displacement-value threshold, outputs a motion signal to the controller 93 of the machine tool 9 to inform the controller 93 that the machine component 92 is in motion, such that the controller 93 may halt relevant operations of the machine tool 9 if the controller 93 receives the motion signal at a time that the machine component 92 should not be moving (e.g., when the controller 93 does not instruct the machine component 92 to perform an operation) to prevent machinery damage of the machine tool 9 or injury of workers/operators. The displacement-value threshold may be chosen as a value greater than zero in consideration of computation and environmental errors. In an advanced embodiment, when the displacement value does not exceed the displacement-value threshold, the computing unit 41 outputs a non-motion signal to the controller 93 to indicate that the machine component 92 is not in motion.

The computing unit 41 is also configured to calculate a vibration value based on the high-frequency signal, the vibration value being related to vibration that may be caused by, for example, a scratch or a pit on the machine component 92 (step 101). The computing unit 41 may compare the vibration value with a vibration-value threshold, and instruct the alarm unit 42 to deliver an alarm signal when the vibration value is greater than the vibration-value threshold.

According to some embodiments, the alarm signal may be a light signal, a sound signal or a text message directly shown by the alarm unit 42, and the alarm unit 42 may include a light bulb, a speaker or a screen accordingly. According to other embodiments, the alarm signal may be electrical signals transmitted to the controller 93 or other alarm device(s) in order for the machine tool 9 or the other alarm device(s) to exhibit the light signal, the sound signal or the text message.

In an embodiment, the computing unit 41 compares the vibration value with two vibration-value thresholds, namely a higher vibration-value threshold and a lower vibration-value threshold. In this embodiment, the computing unit 41 first compares the vibration value with the higher vibration-value threshold. If the vibration value is greater than the higher vibration-value threshold, the computing unit 41 would instruct the alarm unit 42 to deliver a first alarm signal indicating severe vibration, in order for an operator/supervisor of the machine tool 9 to take appropriate measures accordingly (e.g., shut down the machine tool 9 for adjustment or part-replacement). If the vibration value is not greater than the higher vibration-value threshold, the computing unit 41 further compares the vibration value with the lower vibration-value threshold, and when the vibration value is greater than the lower vibration-value threshold, would instruct the alarm unit 42 to deliver a second alarm signal indicating not-that-severe vibration, in order for the operator/supervisor of the machine tool 9 to take appropriate measures accordingly (e.g., examine the machine tool 9 or the machine component 92, or adjust working parameters of the machine tool 9 or the machine component 92).

According to an embodiment, the computing unit 41 is configured to calculate the accumulated moving distance based on the displacement value calculated based on the low-frequency signal (step 101). For example, the computing unit 41 may add the moving distance thus calculated together with historic moving distance(s) calculated earlier into the accumulated moving distance. The accumulated moving distance is related to a distance the machine component 92 has moved (e.g., due to task requirements) since the last time the machine component 92 was oiled. The computing unit 41 may compare the accumulated moving distance thus calculated with a predetermined moving-distance threshold (step 102), and output the oiling signal to the machine tool 9 when the accumulated moving distance is greater than the moving-distance in order to trigger the oiling device 91 to oil the machine component 92 (step 103).

According to an embodiment, the computing unit 41 is also configured to calculate, in step 101, the vibration-variation value based on an initial vibration value and the vibration value, which is calculated based on the low-frequency signal. The initial vibration value relates to an initial vibration level of the machine component 92 detected at the time the machine component 92 was freshly oiled the most recent time (right about the moment the machine component 92 was oiled the last time). In some embodiments, the initial vibration value is equal to the vibration value that was calculated upon the most recent output of the oiling signal. According to an embodiment, the vibration-variation value may be calculated by subtracting the initial vibration value from the vibration value. The computing unit 41 may then compare the vibration-variation value with a predetermined vibration-variation threshold (step 102), and output the oiling signal to the machine tool 9 when the vibration-variation value is greater than the vibration-variation threshold (step 103).

According to an embodiment, the computing unit 41 may further calculate a vibration-variation value with respect to each of the remaining analysis signal(s) (e.g., the middle-frequency signal, the sensor-resonance signal and/or the structure-resonance signal) in a way similar to the high-frequency signal, compare each vibration-variation value with a corresponding threshold, and output the oiling signal to the machine tool 9 when any of said vibration-variation value(s) is greater than the corresponding threshold.

In addition, in an embodiment, the computing unit 41 outputs the oiling signal to the machine tool 9 when a predetermined period of time has elapsed since the most recent output of the oiling signal. In some embodiments, the computing unit 41 includes a timer (not shown) to time an elapsed time since the most recent output of the oiling signal.

In some embodiments, upon outputting the oiling signal in step 103, the elapsed time and the accumulated moving distance are reset to zero. The calculated values (including the displacement value, the vibration value, the accumulated moving distance and the vibration-variation value, etc.) and time points recording when the control device 4 has output oiling signal(s) and when the control device 4 has delivered alarm signal(s) may be stored in the database 43 for future use. In addition, information about these calculated values and time points may be displayed on a display device 5 to be shown to users/operators of the control system 100 and/or the machine tool 9. Said information may be displayed as graphics or numeric data. According to some embodiments, the display device 5 may be a monitor that is electrically connected to the control device 4 and that is integrated in or remote to the control device 4, a screen of a mobile device in communication with the control device 4, or a screen of a computing device (e.g., a computer) in communication with the control device 4.

Figure 11:
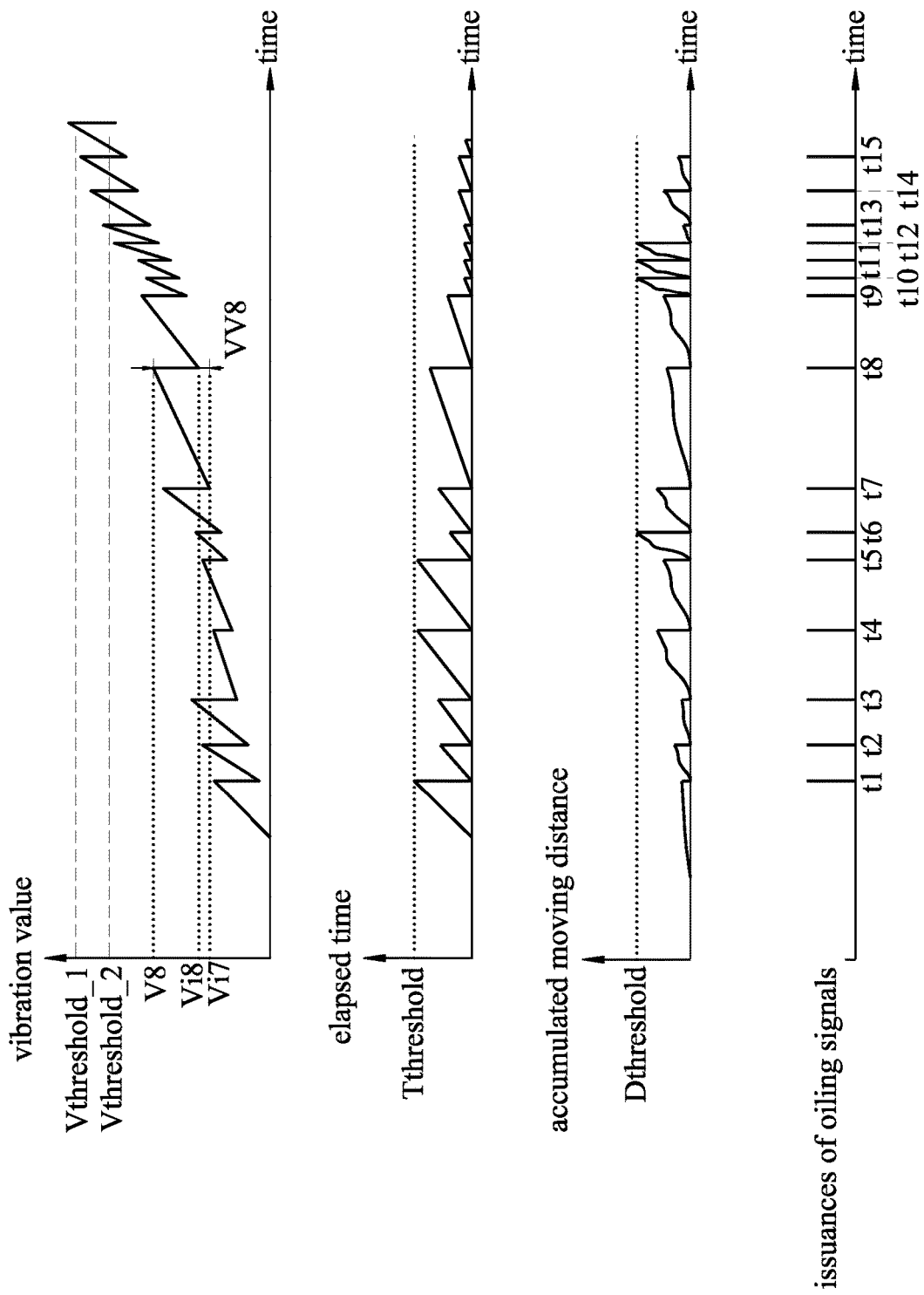
FIG. 11 schematically illustrates an exemplary timeline of issuance of oiling signals.

FIG. 11 schematically illustrates an exemplary timeline of issuance of oiling signals by the control device 4 to the machine tool 9 due to various causes, where Vthreshold_1 denotes a first vibration-value threshold (i.e., the higher vibration-value threshold), Vthreshold_2 denotes a second vibration-value threshold (i.e., the lower vibration-value threshold), Tthreshold denotes the predetermined time length, and Dthreshold denotes the moving-distance threshold. The oiling signal is issued fifteen times (at time points t1, t2, . . . , t14 and t15) in FIG. 11, where the issuances at time points t1, t4 and t5 are caused by the elapsed time from a most recent issuance of the oiling signal reaching the predetermined time length, the issuances at time points t2, t3, t7-t9 and t13-t15 are caused by the vibration-variation value reaching a vibration-variation threshold, and the issuances at time points t6 and t10-t12 are caused by the accumulated moving distance reaching the moving-distance threshold. For example, the oiling signal is issued at time point t8 because the vibration-variation value at time point t8 (denoted as VV8) that is the difference between the vibration value at time point t8 (denoted as V8) and the initial vibration value at the time (denoted as Viz) after an oiling signal was issued at time point t7) exceeds the vibration-variation threshold (not shown).

It should be noted that the control system may include more than one sensor 2, more than one signal-processing device 3 corresponding respectively to the more than one sensor 2, and more than one control device 4 corresponding respectively to the more than one signal-processing device 3. In an embodiment in which the control system includes plural sensors 2, plural signal-processing devices 3 corresponding respectively to the plural sensors 2, and plural control devices 4 corresponding respectively to the plural signal-processing devices 3, each signal-processing device 3 generates a set of analysis signals (including at least a high-frequency signal and a low-frequency signal) derived from the sense signal received from the corresponding sensor 2, and each control device 4 calculates a displacement value, a vibration value, an accumulated moving distance and a vibration-variation value based on the analysis signals received from the corresponding signal-processing device 3, and performs subsequent analysis and/or controls operations as stated above. That is, the machine tool 9 may receive the oiling signal when any displacement value, vibration value, accumulated moving distance or vibration-variation value corresponding to any of the plural sensors 2 exceeds a corresponding threshold.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A control system for controlling oil-injection of a machine tool that includes an oiling device and a machine component, said control system comprising:
    a sensor that is to be disposed on the machine tool, and that is configured to sense movement of the machine component and to output, based on the movement of the machine component thus sensed, a sense signal related to vibration of the machine component;
    a signal-processing device that is capable of communication with said sensor to receive the sense signal from said sensor, and that is configured to derive, from the sense signal thus received, a low-frequency signal and a high-frequency signal that correspond respectively to different frequency bands; and
    a control device that is electrically connected to said signal-processing device and that is configured to
        receive the low-frequency signal and the high-frequency signal from said signal-processing device,
        calculate an accumulated moving distance based on the low-frequency signal,
        calculate a vibration-variation value based on the high-frequency signal,
        output an oiling signal to the machine tool when the accumulated moving distance thus calculated is greater than a moving-distance threshold, the oiling signal triggering the oiling device to oil the machine component, and
        output the oiling signal to the machine tool when the vibration-variation value thus calculated is greater than a vibration-variation threshold.

2. The control system of claim 1, wherein said signal-processing device includes a signal-revision unit configured to generate a revised signal from the sense signal based on amplitude responses of a predetermined frequency response curve of the machine component, and wherein the low-frequency signal and the high-frequency signal are derived from the revised signal.

3. The control system of claim 1, wherein said signal-processing device includes:
    an amplifier unit configured to amplify the sense signal into an amplified signal;
    a signal-splitting unit configured to derive, from the amplified signal, a low-frequency split signal and a high-frequency split signal that correspond respectively to different frequency bands; and
    a signal-revision unit configured to adjust, based on amplitude responses of a predetermined frequency response curve of the machine component, the low-frequency split signal and the high-frequency split signal derived from the sense signal into the low-frequency signal and the high-frequency signal, respectively.

4. The control system of claim 1, wherein said signal-processing device includes a signal-splitting unit configured to derive the low-frequency signal, the high-frequency signal, a middle-frequency signal, a sensor-resonance signal and a structure-resonance signal from the sense signal, and wherein the low-frequency signal, the high-frequency signal, the middle-frequency signal, the sensor-resonance signal and the structure-resonance signal correspond respectively to different frequency bands.

5. The control system of claim 1, wherein said controlling device is configured to:
    calculate a vibration value based on the high-frequency signal; and
    calculate the vibration-variation value based on the vibration value thus calculated and on an initial vibration value.

6. The control system of claim 5, wherein said control device includes an alarm unit that is configured to deliver an alarm signal when the vibration value is greater than a vibration-value threshold.

7. The control system of claim 1, wherein:
    said sensor is configured to sense acceleration of the machine component and to output the sense signal related to the acceleration of the machine component; and
    said control device includes a computing unit configured to calculate a displacement value by performing double integration on acceleration measurement derived from the low-frequency signal, and to calculate the accumulated moving distance based on the displacement value thus calculated.

8. The control system of claim 7, wherein said control device is configured to output, when the displacement value thus calculated is greater than a displacement-value threshold, a motion signal indicating that the machine component is in motion.

9. The control system of claim 1, wherein said control device is configured to output the oiling signal after a predetermined period of time has elapsed since a most recent output of the oiling signal.

10. The control system of claim 1, wherein said control device includes a database for storing the accumulated moving distance.

11. The control system of claim 1, further comprising a display device for displaying information about the accumulated moving distance.

12. A method for controlling oil-injection of a machine tool that includes an oiling device and a machine component, the method to be implemented by a control device electrically connected to a signal-processing device, the signal-processing device deriving a low-frequency signal and a high-frequency signal corresponding respectively to different frequency bands from a sense signal outputted by a sensor, the sensor sensing movement of the machine component and outputting the sense signal related to vibration of the machine component, the method comprising steps of:
    calculating an accumulated moving distance based on the low-frequency signal;
    calculating a vibration-variation value based on the high-frequency signal;
    outputting an oiling signal to the machine tool to trigger the oiling device to oil the machine component when the accumulated moving distance thus calculated is greater than a moving-distance threshold; and
    outputting the oiling signal to the machine tool when the vibration-variation value thus calculated is greater than a vibration-variation threshold.

13. The method of claim 12, further comprising a step of:
calculating a vibration value based on the high-frequency signal;
wherein the step of calculating a vibration-variation value includes calculating the vibration-variation value based on the vibration value and an initial vibration value.

14. The method of claim 13, further comprising a step of:
delivering an alarm signal when the vibration value is greater than a vibration-value threshold.

15. The method of claim 12, the sensor sensing acceleration of the machine component and outputting the sense signal related to the acceleration of the machine component, the method further comprising a step of:
calculating a displacement value by performing double integration on acceleration measurement derived from the low-frequency signal;
wherein the step of calculating an accumulated moving distance includes calculating the accumulated moving distance based on the displacement value.

16. The method of claim 15, further comprising a step of:
outputting a motion signal indicating that the machine component is in motion when the displacement value thus calculated is greater than a displacement-value threshold.

17. The method of claim 12, further comprising a step of:
outputting the oiling signal after a predetermined period of time has elapsed since a most recent output of the oiling signal.

18. The method of claim 12, the method to be implemented further by the signal-processing device and further comprising steps of:
adjusting, by the signal-processing device, the sense signal into a revised signal based on amplitude responses of a predetermined frequency response curve of the machine component; and
deriving, by the signal-processing device, the low-frequency signal and the high-frequency signal from the revised signal.

19. The method of claim 12, the method to be implemented further by the signal-processing device and further comprising steps of:
based on amplitude responses of a predetermined frequency response curve of the machine component, adjusting, by the signal-processing device, an amplified low-frequency signal and an amplified high-frequency signal derived from the sense signal into the low-frequency signal and the high-frequency signal, respectively.

20. The method of claim 12, the method to be implemented further by the signal-processing device and further comprising steps of:
deriving from the sense signal, by the signal-processing device, the low-frequency signal, the high-frequency signal, a middle-frequency signal, a sensor-resonance signal and a structure-resonance signal that correspond respectively to different frequency bands.

\* \* \* \* \*